US012443458B2

(12) United States Patent
Thyagaturu et al.

(10) Patent No.: US 12,443,458 B2
(45) Date of Patent: Oct. 14, 2025

(54) EFFICIENT ACCELERATOR OFFLOAD IN MULTI-ACCELERATOR FRAMEWORK

(71) Applicant: Intel Corporation, Santa Clara, CA (US)

(72) Inventors: Akhilesh S. Thyagaturu, Tempe, AZ (US); Mohit Kumar Garg, Hisar (IN); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 17/529,149

(22) Filed: Nov. 17, 2021

(65) Prior Publication Data

US 2022/0075655 A1     Mar. 10, 2022

(51) Int. Cl.
*G06F 9/50* (2006.01)

(52) U.S. Cl.
CPC ............ *G06F 9/505* (2013.01); *G06F 9/5033* (2013.01); *G06F 9/5044* (2013.01); *G06F 9/5088* (2013.01)

(58) Field of Classification Search
None
See application file for complete search history.

(56) References Cited

U.S. PATENT DOCUMENTS

| | | | |
|---|---|---|---|
| 9,940,241 B1 * | 4/2018 | Mehrotra | ............ G06F 12/0811 |
| 2018/0095750 A1 | 4/2018 | Drysdale et al. | |
| 2018/0157531 A1 | 6/2018 | Bobba et al. | |
| 2019/0095365 A1 | 3/2019 | Gopal | |

OTHER PUBLICATIONS

Clemente et al. "A Mapping-Scheduling Algorithm for Hardware Acceleration on Reconfigurable Platforms." ACM Transactions on Reconfigurable Technology and Systems (TRETS), Jun. 2014, 28 pages.
Gao et al, "Hardware-Assisted Context Management for Accelerator Virtualization: A Case Study with RSA." In International Conference on Architecture of Computing Systems, Springer, Cham, Apr. 2016, 12 pages.

(Continued)

*Primary Examiner* — Eric C Wai
(74) *Attorney, Agent, or Firm* — Compass IP Law PC

(57) ABSTRACT

Methods, apparatus, and software for efficient accelerator offload in multi-accelerator frameworks. One multi-accelerator framework employs a compute platform including a plurality of processor cores and a plurality of accelerator devices. An application is executed on a first core and a portion of the application workload is offloaded to a first accelerator device. In connection with moving execution of the application to a second core, a second accelerator devices to be used for the offloaded workload is selected based on core-to-accelerator cost information for the second core. This core-to-accelerator cost information includes core-accelerator cost information for combinations of core-accelerator pairs, which are based, at least on part, on latencies projected for interconnect paths between cores and accelerators. Both single-socket and multi-socket platform are supported. The solutions include mechanisms for moving offloaded workloads for multiple accelerator devices, as well as synchronizing accelerator operations and workflows.

20 Claims, 7 Drawing Sheets

(56) References Cited

OTHER PUBLICATIONS

Huang et al, "Energy Efficient DVFS Scheduling for Mixed-Criticality Systems." 2014 International Conference on Embedded Software (EMSOFT), Oct. 2014, 13 pages.

Morais et al. "Adding Tightly-Integrated Task Scheduling Acceleration to a RISC-V Multi-core Processor." In Proceedings of the 52nd Annual IEEE/ACM International Symposium on Microarchitecture, Oct. 2019, 12 pages.

Saha et al, "An Experimental Evaluation of Real-Time DVFS Scheduling Algorithms." In Proceedings of the 5th Annual International Systems and Storage Conference, pp. 1-12, 156 pages, Sep. 9, 2011.

Von Laszewski et al, "Power-Aware Scheduling of Virtual Machines in DVFS-enabled Clusters." In 2009 IEEE International Conference on Cluster Computing and Workshops, Oct. 2009, 10 pages.

Extended European Search Report for Patent Application No. 22201668.5, Mailed Mar. 3, 2023, 9 pages.

\* cited by examiner

EFFICIENT ACCELERATOR OFFLOAD IN MULTI-ACCELERATOR FRAMEWORK

BACKGROUND INFORMATION

In recent years, the use of "accelerators" has seen significant growth. Accelerators, such as Field Programmable Gate Arrays (FPGAs), Graphic Processing Units (GPUs), General-Purpose GPUs (GP-GPUs), Application Specific Integrated Circuits (ASICs) and similar devices are configured to perform certain tasks faster than the task would be performed via execution of software on cores on a central processing unit (CPU) and/or such accelerators are used for offloading CPU workloads.

On-die accelerators may be coupled to CPU cores using on-die interconnects. Off-chip accelerators (e.g., accelerators that are not part of a processor System on a Chip (Soc)) are generally connected to the SoC via high-speed interconnects such as Peripheral Component Interconnect Express (PCIe) or Compute Express Links (CLX). Under current implementations, the operating systems, applications, virtual machines (VMs), and containers see the accelerators as compute resources with uniform access which means, the cost of accessing the accelerator devices from cores are considered constant. But, in reality, the cost of accessing each accelerator varies, depending on which core the application thread is running on, and the interconnect latency to the accelerator.

Additionally, during acceleration, if applications move around the cores on the system, e.g., among different cores belonging to different dies and sockets, the data movement path results in an ineffective way of utilizing the on-chip interconnect resources. Effective interconnect resource translates to low-latency and deterministic performance. Core-to-Accelerator distance and latency cost is not the same for any pair of core-accelerator. Core affinity of application threads could not be applied to all scenarios, and requires static resource allocations, which results in waste of core resources (disadvantage due to no statistical multiplexing).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
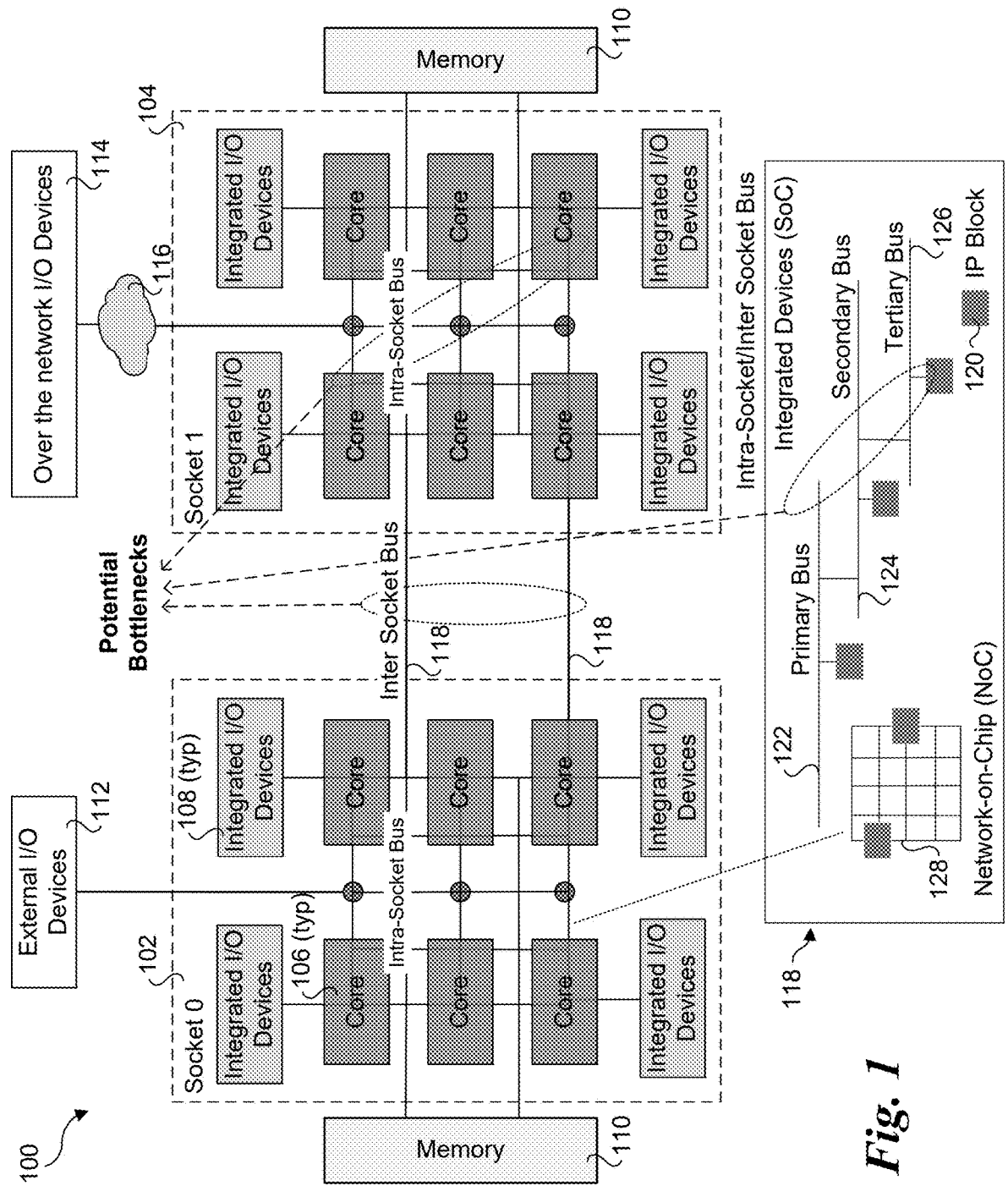
FIG. 1 is a schematic diagram illustrating a multi-socket compute platform that is illustrative of platforms on which the solutions described herein may be implemented.

Embodiments of methods, apparatus, and software for efficient accelerator offload in multi-accelerator frameworks are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 shows a multi-socket compute platform 100 that is illustrative of platforms on which the solutions described herein may be implemented. Platform 100 includes a pair of sockets 102 and 104 (also labeled and referred to as Socket 0 and Socket 1, each having a similar configuration. Each of sockets 102 and 104 employ an SoC architecture and included a plurality of cores 106 that are interconnected to on-chip integrated Input/Output (I/O) devices 108 by means of various interconnect circuitry, as depicted as an intra-socket bus, which represents an abstraction of the physical interconnect structure. In addition to interconnecting cores 106 and integrated I/O devices 108, the intra-socket bus circuitry is connected to one or more memory interfaces (e.g., an integrated memory controller) (not shown) connected to memory 110, and one or more I/O interfaces (not shown) coupled to one or more external I/O devices 112. As shown for Socket 1, the cores and other circuitry on the SoC may be connected to over the network I/O devices 114 via a network 116 and on-chip network interface (not shown). Sockets 0 and 1 are also interconnected via one or more inter socket buses 118.

The lower portion of FIG. 1 shows a sub-diagram 118 illustrating further details of the intra-socket bus and inter socket buses 118. Cores 106 and integrated I/O devices 108 are types of IP (Intellectual Property) blocks 120 that are integrated on an SoC. Generally, the intra-socket buses employ an interconnect hierarchy including multiple levels, as depicted by a primary bus 122, a secondary bus 124, and a tertiary bus 126. The buses at a given level may employ the same of different bus structures and protocols. For example, a primary bus may represent an interconnect structure and associated protocol for implementing a coherent memory domain, while a secondary and/or tertiary bus may employ and I/O protocol, such as but not limited to Peripheral Component Interconnect Express (PCIe). The on-chip bus structures and protocols may also include proprietary and standardized structures and protocols. When different protocols are implemented at different levels in the interconnect hierarchy, applicable bridges may be employed.

Sub-diagram 118 also shows a Network-on-Chip (NoC) 128. The NoC is illustrative of any type of interconnect structure that is used to interconnect IP blocks using network-type addressing, including mesh interconnect structures, ring-type interconnect structures, toroid structures, three-dimensional (3D) structures, etc.

Generally, the cores in an SoC may be configured in a conventional processor/SoC architecture or a tile-based architecture. For example, a conventional processor/SoC architecture may include cores with associated Level 1 (L1) and Level 2 (L2) caches that are interconnected to in a coherent memory domain to a Last Level Cache (LLC) and various memory interface components. Other cache/memory configuration may also be implemented.

A tile-based scheme may employ multiple types of tiles, including but not limited to core tiles and I/O tiles. Each type of tile may be replicated in the SoC. As before, a core tile may include a core with associated L1 and L2 caches. A tile will also include some type of interface to communicate with other tiles using applicable NoC interconnect structures and protocols. Under some nomenclature, the tiles may be referred to 'nodes' that are interconnected by the NoC circuitry.

In some embodiments, cores 106 and their associated L1 and L2 caches are IP blocks in a Central Processing Unit (CPU). Generally, in the art a CPU may be considered to comprise an SoC (as a whole) or may represent circuitry on a SoC. For example, some SoCs may include a CPU and one or more integrated 'Other Processing Units.' Other Processing Units are collectively termed 'XPUs,' which may include one or more of Graphic Processor Units (GPUs) or General-Purpose GPUs (GP-GPUs), Tensor Processing Units (TPUs), Data Processor Units (DPUs), Infrastructure Processing Units (IPUs), Artificial Intelligence (AI) processors or AI inference units and/or other accelerators, Field Programmable Gate Arrays (FPGAs) and/or other programmable logic (used for compute purposes), etc. While some of the diagrams herein show the use of CPUs and/or CPU cores, this is merely exemplary and non-limiting. Generally, any type of XPU may be used in place of a CPU in the illustrated embodiments. Moreover, as used in the following claims, the term "processor" is used to generically cover CPUs and various forms of XPUs.

Under the embodiments disclosed herein, various of integrated I/O devices 108, external I/O devices 112 and other IP blocks (not shown) may comprise "accelerators." As discussed above, an accelerator may comprise an on-chip or on-die component, as illustrated by integrated I/O devices 108, or may comprise an off-chip component, such as depicted by external I/O devices 112. Non-limiting examples of on-chip/on-die accelerators including FPGAs, GPUs, GP-GPUs, TPUs, DPUs, AI processors and AI inference units. Each of the foregoing may also be implemented in an external I/O device. An IPU, which may also be referred to as a "SmartNIC," is currently implemented as an external I/O device, but may be implemented on an SoC in future devices.

In some embodiments, accelerators are implemented on an external I/O device 112 comprising a PCIe component mounted on a platform's main board or daughterboard or the like or PCIe card coupled to a PCIe slot in the platform. Alternatively, such an external I/O device may comprise a CXL component or CXL card. In addition to PCIe and CXL, other I/O link technologies and associated protocols may be employed.

During ongoing platform operations, workloads are offloaded from cores 106 to on-chip and/or off-chip accelerators. Since the applications themselves (more specifically, the application's threads and processes) execute on the cores, there is a need for communication between the (threads/processes run on the) cores and the accelerators. Depending on interconnects that are traversed to facilitate this communication, the core-accelerator latency may vary.

Latency may also be affected by other traffic sharing the interconnect paths. This is depicted in FIG. 1 as potential bottlenecks. Generally, the bottlenecks may occur for both the intra-socket buses and the inter socket buses. Various protocols and schemes are employed to address bus/interconnect contention, such as round-robin protocols and priority-based protocols. It will also be recognized by those skilled in the art that a give protocol may employ different sets of "wires" for different classes of messages.

As referred to herein, the latency of the communication path between a core and an accelerator is called an "accelerator-to-core" cost. Generally, an accelerator-to-core cost may be a function of the interconnect path between a given accelerator and a given core. This latency for this path is nominally deterministic. However, when there is traffic contention, a given path or one or more path segments may be non-deterministic. This is undesirable.

In accordance with aspects of the embodiments disclosed herein, solutions are provided to enable applications, VMs, Containers, and orchestrator to be able to define, request, and influence the selection of accelerator devices, while allowing the processes and threads to move across cores. In addition, some embodiments have no restrictions on locality to core while reducing the interconnect resource utilizations, thereby reducing the latency and improving deterministic performance.

In one aspect, improved performance can be obtained by moving applications between cores on different sockets. The reason for doing so is that the workload on a given core (and/or given socket) may change over a given time period, which might be a short duration (e.g., on the scale of hours), or a longer duration (on the scale of days). For platforms employed for cloud-based services, a given core may execute dozens or more threads at a time. The threads are scheduled for execution using fixed-duration time slices, wherein the time slices may be allocated using one or more priority levels. For simplicity, consider a core executing 100 threads having the same priority level. The result is a given thread would be scheduled to be executed on the core once every 100 time slices.

Thread scheduling is managed by the operating system (OS). The OS implements a thread scheduling scheme with the objective to maximum performance in view of changing workloads. While this objective can (generally) be met for workloads that solely involve use of CPU cores, it becomes more challenging when some of the workload is offloaded to accelerators. While the use of accelerators ultimately improves workload throughput, static use of core-accelerator pairs may lead to inefficiencies.

To obtain increased performance and workload throughput, it may be advantageous to migrate application processes and threads between platform cores. In some cases, the migration may be between cores on different sockets. At the same time, it is generally not advantageous to move an application's offloaded workload between accelerators. In addition, depending on the platform and/or SoC resources, there may be limited replication of accelerator resources for a given type of offloaded workload.

Figure 2A:
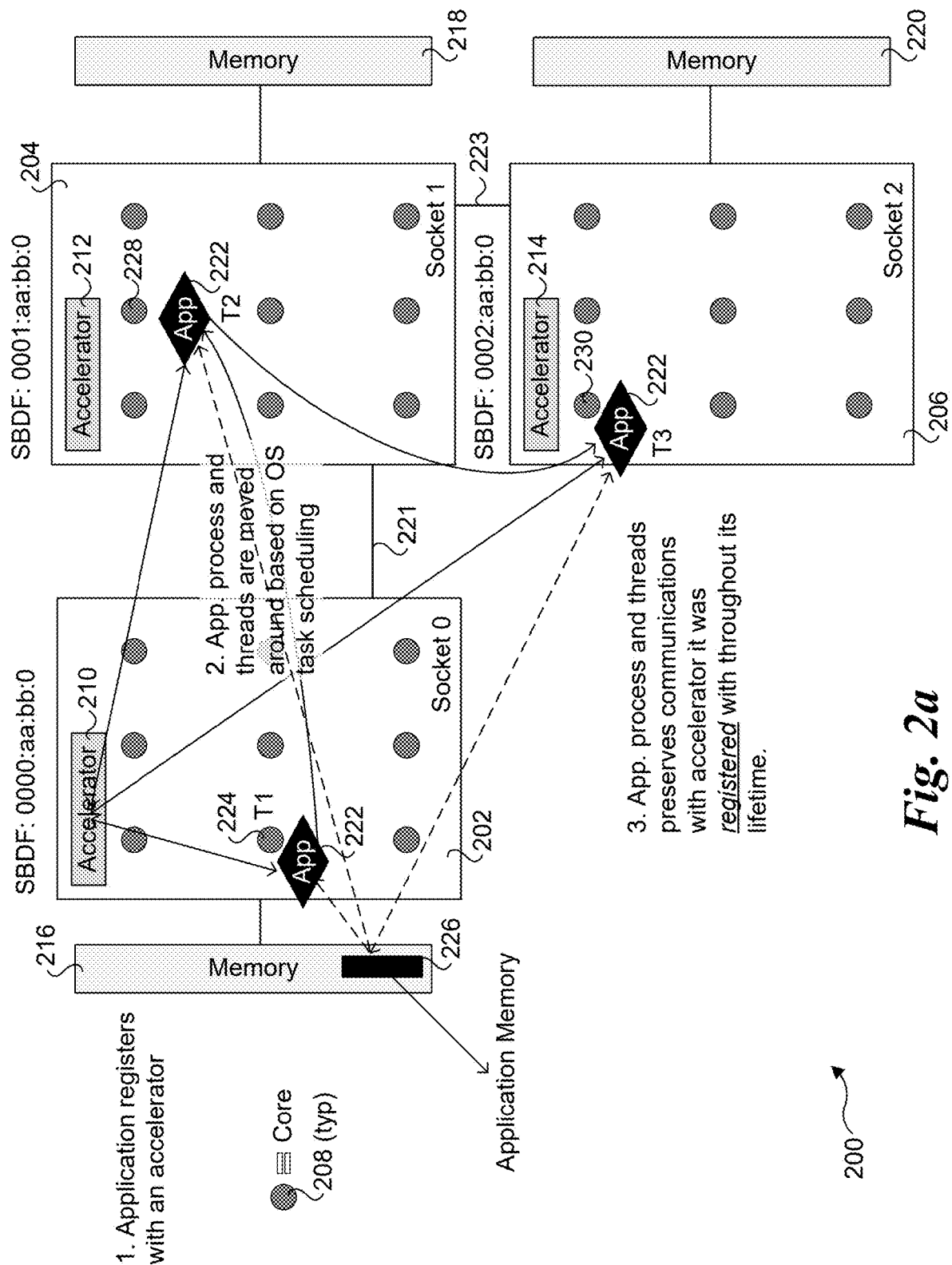
FIG. 2a is a diagram illustrating an example of a process that is implemented to move application process and/or thread execution between cores implemented on different sockets under a current approach.

FIG. 2a shows an example of a process 200 that is implemented to move process and/or thread execution between cores implemented on different sockets under a current approach. As shown, each of sockets 202, 204, and 206 (also labeled and referred to as Socket 0, Socket 1, and Socket 2) include multiple cores 208. Sockets 0, 1, and 2 include respective accelerators 210, 212, and 214. Socket 0 is coupled to memory 216, while Socket 1 is coupled to memory 218 and Socket 2 is coupled to memory 220. The platform employs a NUMA (Non-Uniform Memory Access) architecture. Sockets 0, 1 and 2 are interconnect by socket-to-socket interconnects 221 and 223.

Processes and threads associated with an application (App) 222 are initially run on a core 224 on Socket 0, as depicted by the 'T1', which is representative of a first timeframe. The code and data for application 222 are stored in application memory 226 that has been allocated for the application in memory 216. Application 222 offloads a portion of its workload to accelerator 210, which is used to perform one or more accelerator functions, such as encryption/decryption, compression/decompression, etc. As indicted by an operation '1', Application 222 registers with an accelerator, which in this case is accelerator 210.

While running on core 224, various workloads executing on core 224 and other cores in Socket 0 increase to the point where it will be advantageous to move execution of application 222 to another core. As indicated by an operation '2', the application's process and threads are moved around based on OS task scheduling. In the example, execution of application 222 is moved to a core 228 on Socket 1, and a time period 'T2' commences. During time period 'T2' application 222 still offloads the portion of the workload to accelerator 210. The initial overhead cost of the move is fairly low, as only the core contexts for the applications threads are moved, while the application code and data is not moved from application memory 226. However, the latency cost between core 228 and accelerator 210 has increased relative to the latency cost between core 224 and accelerator 210. In particular, the interconnect path between core 228 and accelerator 210 includes socket-to-socket interconnect 221.

Toward the end of the second time period 'T2', execution of application 222 is moved a second time to a core 230 on Socket 2. As before, the application is using application memory 226 and offloading the portion of its workload to accelerator 210. This results in an even higher latency for the interconnect path between accelerator 210 and core 223, which now further includes socket-to-socket interconnect 223.

Under a NUMA architecture, the memory spaces for each of memory 216, 218, and 220 are virtualized using a universal (across the platform) address scheme such that the physical location of the memory is decoupled from the location of the cores and accelerators. Also, as shown by an item '3', the application process and threads preserve communication with the accelerator the application was registered with throughout its lifetime, thus decoupling the physical location of the cores and the accelerator. While this decoupling has some benefit, the approach in FIG. 2a is agnostic to the core-to-accelerator transmission latency "distance" or "cost." This may lead to reduced performance, particularly in multi-socket platforms.

Under embodiments of the solutions provided herein, aspects of the foregoing approach are solved by considering the core-to-accelerator "costs" and using those costs to determine accelerators to be used when applications are moved between cores in the platform.

Figures 3A, 3B:
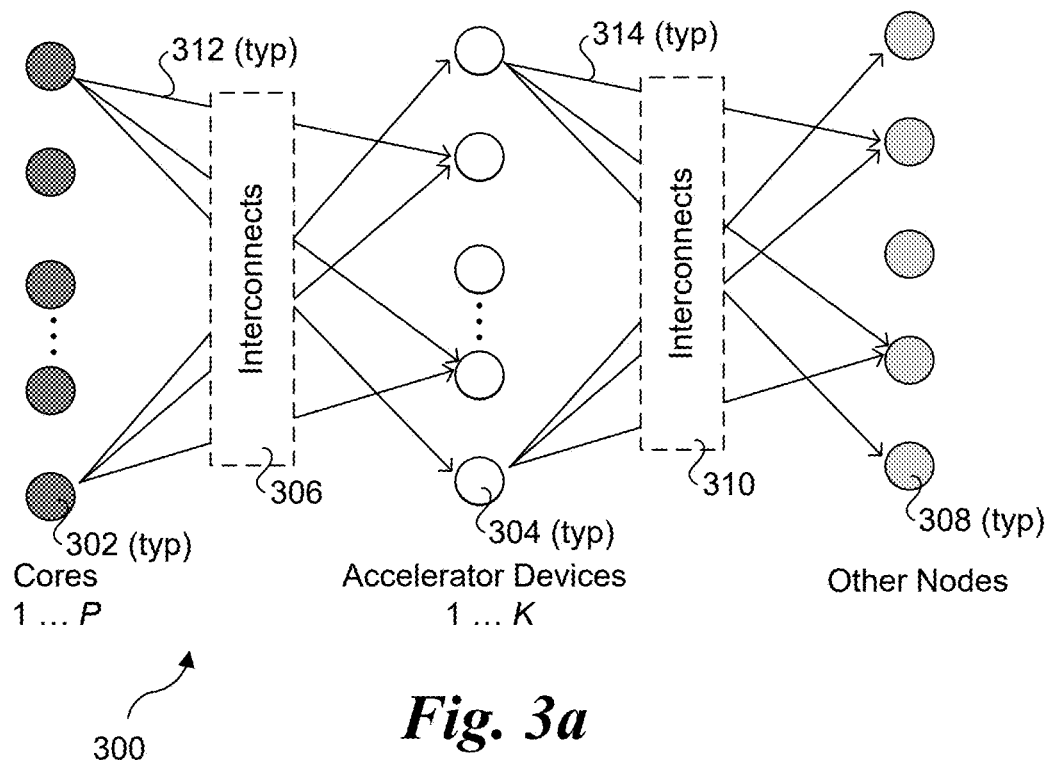
FIG. 3a is a diagram illustrating an abstracted view of a solution employing core-to-accelerator distance cost metrics.
FIG. 3b is an exemplary core-to-accelerator cost table, according to one embodiment

Diagram 300 of FIG. 3a illustrates an abstracted view of this approach. Nodes comprising P cores 302 are interconnected to nodes comprising K accelerator devices via interconnects 306. The K accelerator devices, in turn, are connected to other nodes 308 via interconnects 310. Generally, the other nodes may include but are not limited to memory modules, storage units, cache agents, additional I/O devices, external nodes such as RDMA enabled nodes, Non-Transparent Bridges (NTB) of PCIe, etc. Generally, interconnects 306 and 310 are representative of whatever interconnect structure(s) is/are used to interconnect a pair of nodes.

Each connection between a pair of nodes has an associated cost. For example, each connection 312 between cores 302 and accelerator devices 304 has an associated cost. Likewise, connections 314 between accelerator devices 304 and other nodes 308 have associated costs. The cost is referred to as a "distance cost metric."

FIG. 3b shows an exemplary core-to-accelerator cost table 350 containing core-to-accelerator distance cost metrics (also referred to herein as cost information). The table includes a core ID field 352, an accelerator field 354, and a property field 356. For each Core ID 0 . . . . N, there is a set of accelerator values and a set of properties. In one embodiment, a fully connected matrix of connections between cores and accelerators is provided. In another embodiment, table entries are provided for selected core-accelerator pairs and associated connections for which core-to-accelerator distance cost metrics may be used.

The accelerator field 354 entries include an accelerator type, one or more functions, and static values including a physical location of the accelerator. These static values are used as an initial data for the selection of accelerator device by the application (core). For instance, when initial load of the accelerator after a boot-up is zero, we can select the accelerator based on the static property values. The property field 356 entries include a cost, average load, duration of connection, etc. However, during run-time the static values may not provide the optimal result, especially when the accelerator device is highly loaded. In this case, an alternative device with a lower load and the least cost among available accelerators meeting the requirements should be selected. As a result, an additional property field 356 is implemented that includes a cost, average load, duration of connection, etc. Use of the static values in accelerator field 354 and run-time values in property field 356 enables the optimal accelerator to be selected during run-time.

Generally, the core-to-accelerator cost information may be stored in one or more data structures, such as tables. In one embodiment, as illustrated by core-to-accelerator cost table 350, the core-to-accelerator cost information is store in a single table. Alternatively, multiple tables may be used. For example, under one embodiment, separate tables are used by for each socket—that is, the core-to-accelerator cost information table for a given socket will include core-to-accelerator information for all of that socket's cores and for accelerators that may be reached by those cores.

In one aspect, Advanced Configuration and Power Interface (ACPI) facilities are used to access the core-to-accelerator table entries. This includes the following ACPI request and ACPI response:

ACPI_request {
Request_type: Core cost;
Core ID=[0 . . . N];
Acceleration type=[A, B];
Avg_load_threshold=[a, b];
. . .
}
ACPI_Response {
Accelerator_Rank=
[$SBDF_1$, . . . $SBDF_K$];
Accelerator_Cost=[0, 65535];
{0→low, 65535→high}
Setup duration=T seconds;
. . .
}

In these non-limiting examples, the ACPI request includes a request type, a core ID, and acceleration type, and an average load threshold. The ACPI response includes an accelerator rank, and accelerator cost, and a setup duration in seconds. The ACPI response is interpreted by the application such that the core can choose an accelerator with the reduced cost for increasing the overall system efficiency.

Figure 4:
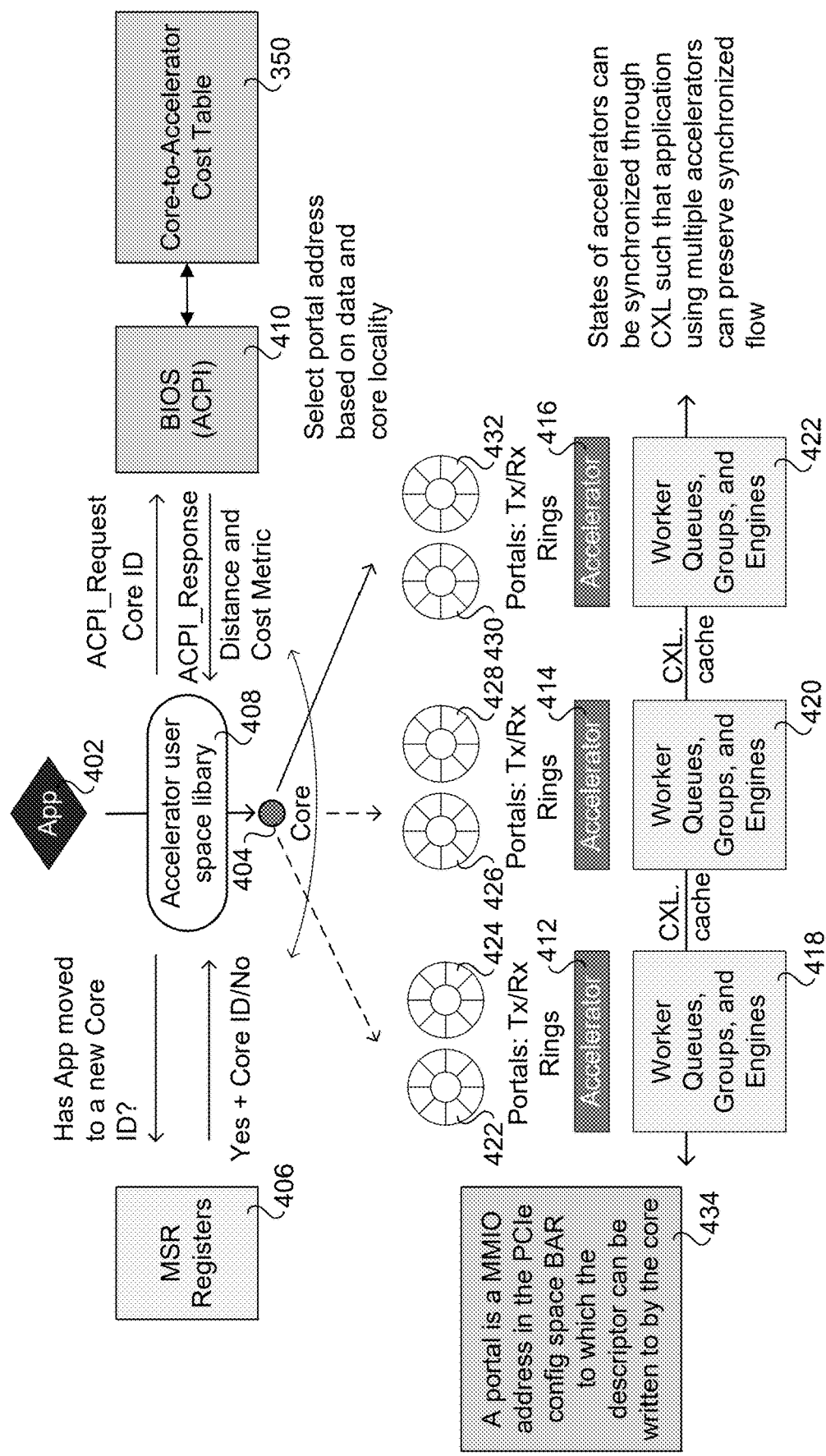
FIG. 4 is a schematic diagram of an implementation architecture illustrating components and block used to implement an embodiment of the solution.

FIG. 4 shows an implementation architecture 400, according to one embodiment. Under architecture 400, an application/OS conducts a ACPI call, and obtains the cost (relative distance and core-to-accelerator) of using an accelerator of a selected type, and selects the least cost path between the core executing the application and that core.

The components in architecture 400 include in application 402 executing on a core 404, MSR (Machine Specific Registers) 406, an accelerator user space library 408, ACPI BIOS 410 coupled to core-to-accelerator cost table 350 and accelerators 412, 414, and 416. Each accelerator 412, 414, and 416 includes a respective set of worker queues, groups, and engines 418, 420, and 422. Each accelerator 412, 414, and 416 also includes a respective set of portals including a transmit (Tx) ring and a receive (Rx) ring, as depicted by Tx rings 422, 426, and 430 and Rx rings 424, 428, and 432.

As shown in a block 434, a portal is a Memory Mapped Input Output (MMIO) address in the PCIe config space BAR (Base Address Register). Applications write work descriptors to the Rx rings, where the descriptors point to where input data is buffered in memory. An accelerator pulls a descriptor off of an Rx ring and uses it to read the input data, which is then processed by the accelerator. Upon completion, the output data (from the process) is written to memory on the accelerator (or locally accessed by the accelerator) and a completion entry is written to the accelerator's Tx ring, where the completion entry points to the location of the output data. The use of the Rx and Tx rings, MMIO, and associated PCIe facilities enable data to be written to and read from memory using Direct Memory Access (DMA) data transfers.

Under this approach, accelerator (internal) memory synchronization and cache synchronization among the accelerator device is used to maintain the consistent acceleration states such that applications (cores) issuing requests to accelerator devices can change the requests among accelerator devices seamlessly during the lifetime of the application. In one embodiment, the CXL protocol can be utilized to asynchronously move the data such as queue depth, service type (e.g., cryptography functions, compression, etc.) within the accelerator memory and cache specific to an application between accelerator devices, such that core can issue request to any accelerator while still maintaining the accelerator integrity.

As described and illustrated in FIG. 2 above, an application is allowed to move across cores (both inter-socket and intra-socket moves). When an acceleration service is required, the application employs an interface in accelerator user space library 408 to send the core ID to the ACPI BIOS using an ACPI_Request comprising an ACPI syscall. The ACPI BIOS then accesses the core to accelerator cost information for the core from core-to-accelerator cost table 350 and returns applicable accelerator-to-core distance metrics using an ACPI_Response. In one embodiment, this operation can be performed infrequently enough, such that accelerator-to-core cost is evaluated once every P jobs. The core-to-accelerator cost information received in the ACPI_Response is processed by the application (or code in the accelerator user space library 408) to identify an accelerator device that supports the required accelerator function and has the lowest cost (among accelerator devices supporting that accelerator function).

Under an alternative scheme, the ACPI_Request includes the accelerator type and the ACPI BIOS is programmed to query the core-to-accelerator table to identify the accelerator device that supports the accelerator type and returns an identifier to the application using a variant of the ACPI_Response.

MSR Registers 406 are used to store the status of the running application threads on the cores. For instance, MSR=1 means "this thread has been moved, software should make an ACPI syscall to get the optimum accelerator device ID" (e.g., the accelerator with the lowest cost metric for that core). The application thread sets MSR to 0 after getting the accelerator device ID and associated information. Note that this MSR can be defined to be thread scoped. In one embodiment, these values can be used for P consecutive jobs for the application before checking the updated information.

A simplified flow is as follows: For every P jobs, read MSR; if set, then re-read the ACPI, and request for new pool of completion records (and free old pool). In addition, based on this ACPI data, the application thread learns which device portal queue to use for the next P jobs.

For polling optimization, a syscall is defined to provide a memory buffer (optimal distance from core) to use for descriptors and completion records. This results in further optimization; in addition to the optimal acceleration device selection, these system addresses will land in the cache (LLC slices) that are optimal distances from core and device. To note, these optimizations are requested only when the application is moved to a different core, for e.g., MSRx=1. The above syscall provides a memory buffer and an array/list of cache-line sized addresses guaranteed to give best polling time (these may not be contiguous in the memory buffer due to configuration of memories and striping of data across the channels).

In one embodiment, the application can use MOVDIR, ENQCMD, or traditional CPU mem-write instructions to write to the accelerator portals. This embodiment is used to request and obtain the best portal address in MMIO space of the accelerator devices, after which, any mechanism for accelerator offload can be used.

Operations and messages associated with the foregoing are depicted in FIG. 4. For example, periodically (e.g., every P jobs for a given core), code in accelerator user space library 408 will check MSR registers 406 for an indication that an application has moved to a new Core ID. If an application has moved, the new Core ID will be read from an applicable MSR register.

As shown in the upper right portion of FIG. 4, code in accelerator space library 408 will send an ACPI_Request message including the new Core ID to ACPI BIOS 410. Under one embodiment, ACPI BIOS 410 will retrieve the core-to-accelerator cost information for the Core ID and return that information to the application in the ACPI_Response message. Under the alternative embodiment, based on the cost information in Core-to-Accelerator cost table 350 filtered on the Core ID and accelerator type, the ACPI BIOS will return information including the device ID for the accelerator to the application (via the accelerator user space library 408 interface) using the ACPI_Response message.

Figure 2B:
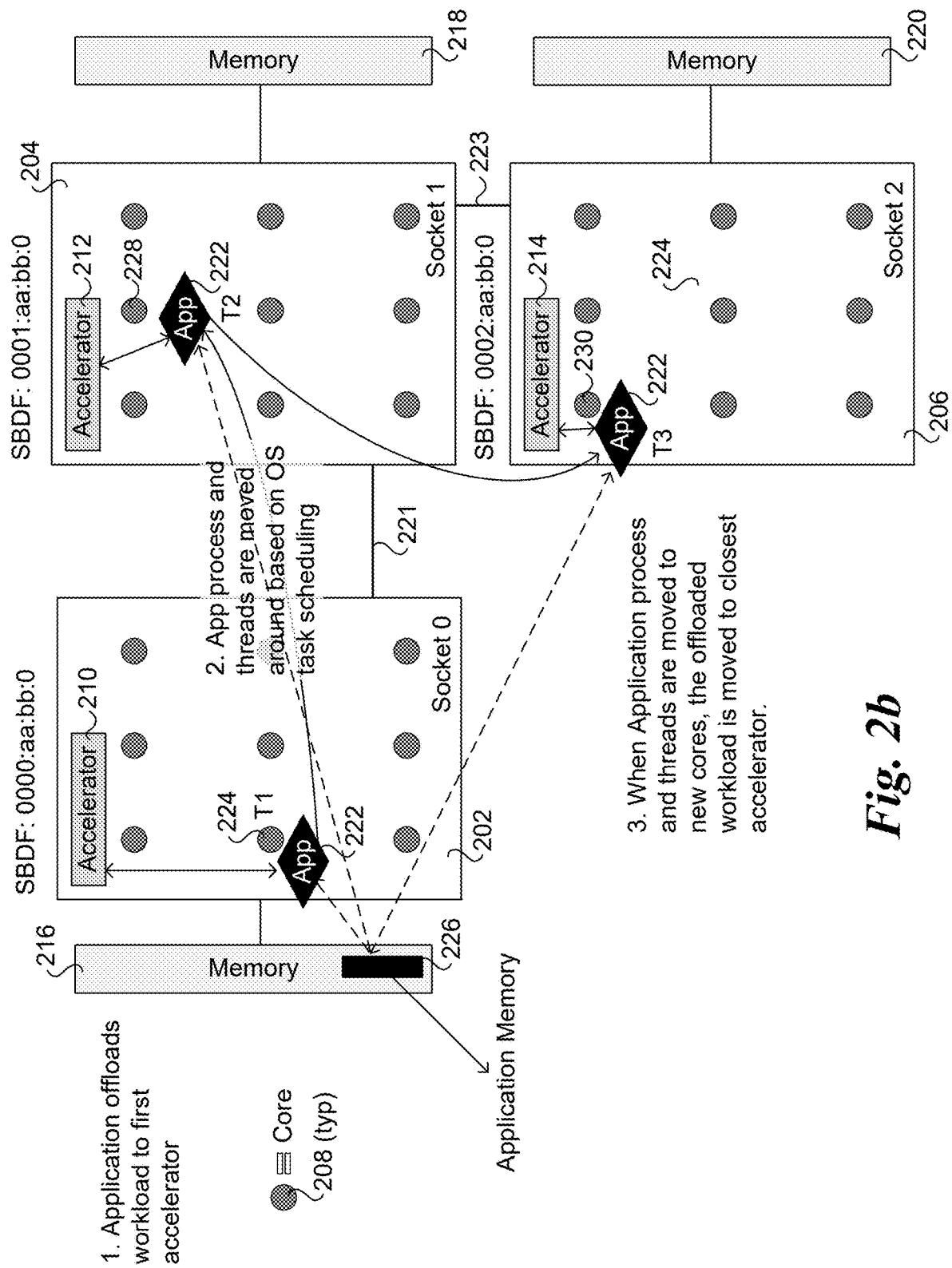
FIG. 2b is a diagram illustrating movement of application process and/or thread execution between cores under an embodiment of a solution employing the principles and teachings disclosed herein.

FIG. 2b shows how the solution is applied to the application movements presented in FIG. 2a discussed above. As indicated by like reference numbers, the components for the platform in FIGS. 2a and 2b are the same. As depicted by a first operation '1', the application offloads a portion of its workload to a first accelerator. For the first time period 'T1', application 222 is running on core 224 on Socket 0 and the workload portion is offloaded to accelerator 210. This is the same configuration as used in FIG. 2a, except application 222 does not register with an accelerator.

Towards the end of time period T1, the operating system moves execution of application 222's process and threads to core 228 on Socket 1, as depicted by operation '2', as before under the approach used in FIG. 2a. However, under the solution and as indicated by item '3', when an application's process and threads are moved to new cores, the offloaded workload is moved to the closest accelerator. Accordingly, in connection with the move to the new core 228, an accelerator with a lowest distance cost metric for core 228 that supports the applicable accelerator function for the offloaded workload is identified using core-to-accelerator distance cost metric entries in the core-to-accelerator cost table. In this example, the closest accelerator that meets the requirement is accelerator 212 on Socket 1. Thus, application 222 offloads the workload portion to accelerator 212 during time period 'T2.'

Toward the end of time period 'T2', the operating system moves execution of application 222's process and threads to core 230 on Socket 2, as before. In a similar manner to the first move, an accelerator with a lowest distance cost metric for core 230 that supports the applicable accelerator function for the offloaded workload is identified using core-to-accelerator distance cost metric entries in the core-to-accelerator cost table. The identified accelerator is accelerator 214, and application 222 offloads the workload portion to accelerator 214 during time period 'T3.'

A comparison between the current approach in FIG. 2a and the solution's approach in FIG. 2b demonstrates how the core-to-accelerator costs are reduced by the solution. While this is a relatively simple example, the principles and teachings provided herein may be applied to more complex platform configurations, including platforms that include both on-chip/on-die accelerator devices and off-chip accelerator devices. Moreover, the techniques may be applied to accelerator devices that are accessed over network connects, as well.

Figure 5:
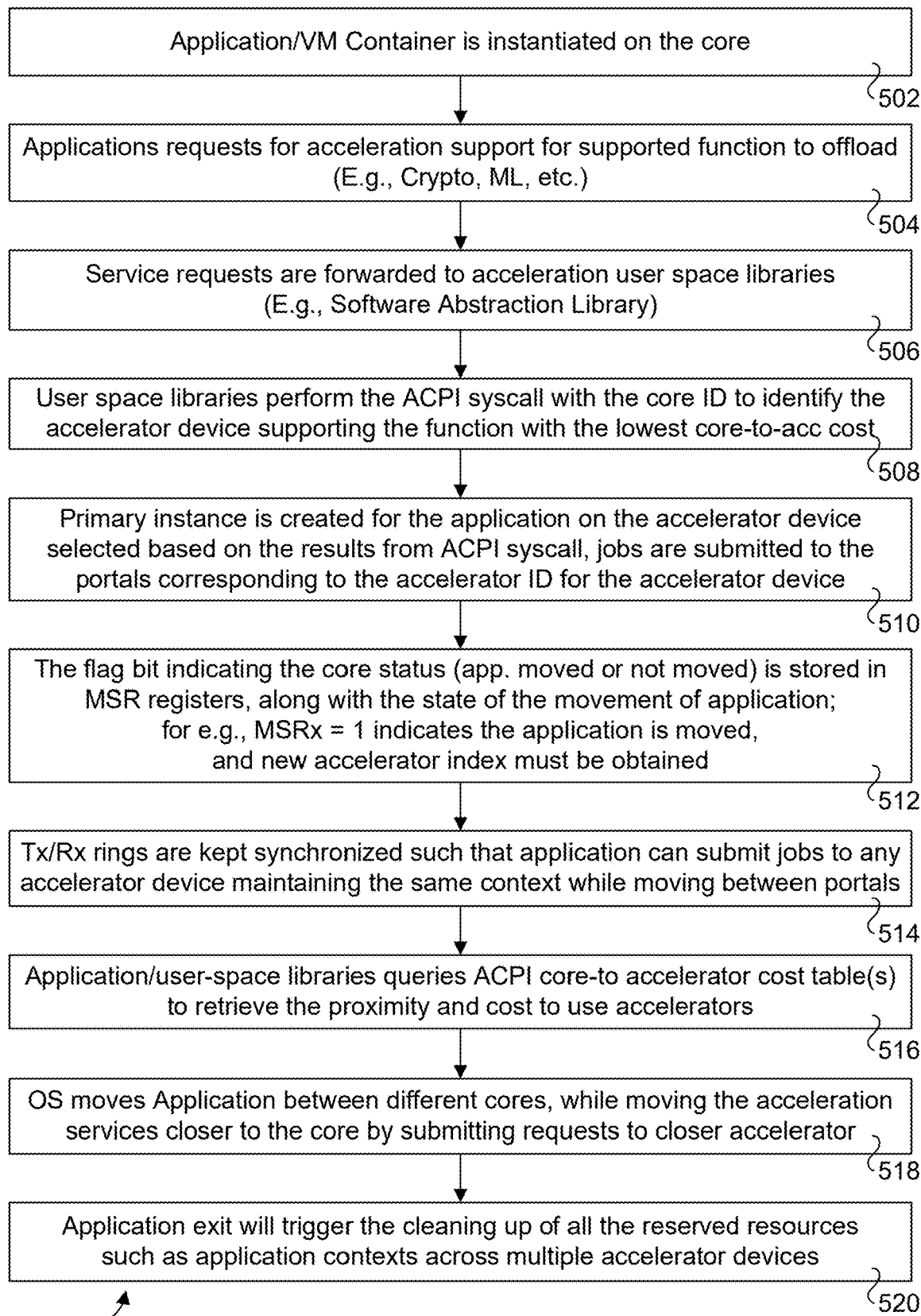
FIG. 5 is a flowchart illustrating operations performed by the platform to move applications (processes and threads) across cores while changing accelerators to reduce core-to-accelerator costs.

FIG. 5 shows a flowchart illustrating operations performed by the platform to move applications (processes and threads) across cores while changing accelerators to reduce core-to-accelerator costs. The process starts in a block 502 in which an application, virtual machine, or container is instantiated on a core. In a block 504 the application requests for acceleration support for some type of supported function, such as a cryptographic function, machine learning (ML) etc., that will be offloaded to an accelerator.

In a block 506 service requests are forwarded to the acceleration user space libraries. In a block 508, the user space libraries perform the ACPI syscall with the core ID to identify the accelerator device supporting the requested function with the lowest core-to-accelerator cost. In one embodiment, the ACPI syscall uses the ACPI_Request and ACPI_Response message structures presented above.

In a block 510, a primary instance is created for the application on the accelerator device selected based on the results from ACPI syscall, and jobs are submitted to the portals corresponding to accelerator ID for the accelerator device. In a block 512, the flag bit indicating the core status (app. moved or not moved) is stored in the MSR registers, along with the state of the movement of application. For example, MSRx=1 indicates the application is moved, and new accelerator index is to be obtained.

In a block 514, the Tx/Rx rings are kept synchronized such that application can submit jobs to any accelerator device maintaining the same context while moving between portals. In a block 516 the application/user-space libraries queries the ACPI core-to-accelerator cost table(s) to retrieve the proximity and cost to use accelerators. In a block 518, the OS move the application between different cores, while moving the acceleration services closer to the core by submitting requests to closer accelerator. In a block 520, an application exit will trigger the cleaning up of all the reserved resources such as application contexts across multiple accelerator devices.

Figure 6:
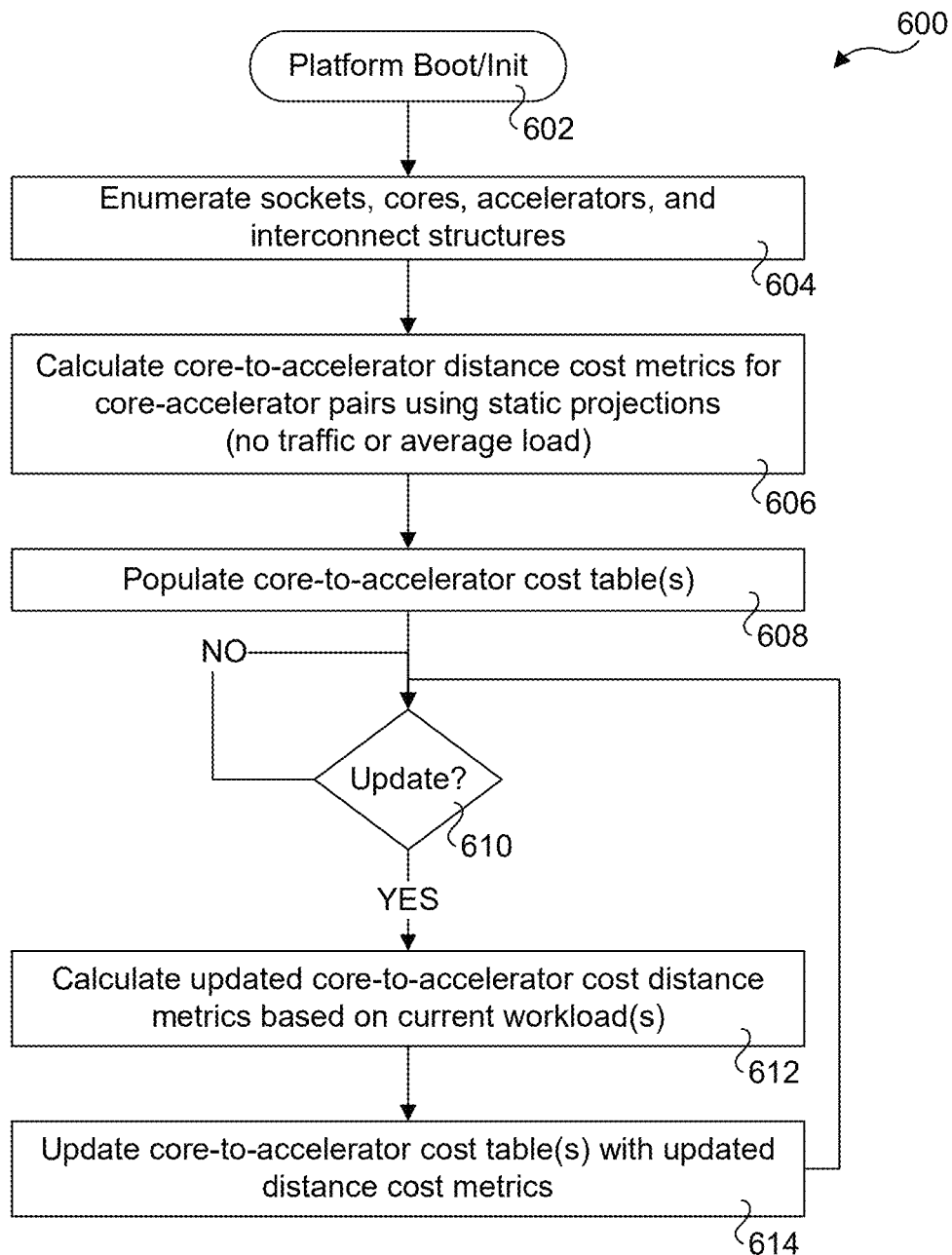
FIG. 6 is a flowchart 600 illustrating operations for initially populating the core-to-accelerator cost table(s) and for updating core-to-accelerator distance cost metrics in consideration of changes in platform workloads.

FIG. 6 shows a flowchart 600 illustrating operations for initially populating the core-to-accelerator cost table(s) and for updating core-to-accelerator distance cost metrics in consideration of changes in platform workloads. The process begins in a start block 602 with the platform booting and associated initialization operations. In a block 604 the platform sockets, cores, accelerators, and interconnect structures are enumerated. This may employ conventional PCIe enumeration for PCIe end devices and PCIe interconnect structures. Other enumeration schemes may be employed for other types of interconnect structures.

In a block 606, core-to-accelerator distance cost metrics are calculated for core-accelerator pairs using static projections. For example, under a no traffic projection, the latencies for interconnect segments and applicable interfaces are aggregated for the interconnect path between a given core and accelerator pair. Under an average load condition, the distance cost metrics may further include historical measurements and/or other criteria to project the end-to-end latencies for the various interconnect paths. As discussed above, the core-accelerator pairs may correspond to a full matrix of possible connections or may be performed for selected cores and/or accelerators that may support the solutions described herein. In a block 608 the core-to-accelerator cost table(s) is/are populated with the core-to-accelerator distance cost metrics calculated in block 606.

The remainder of flowchart 600 is used to perform core-to-accelerator cost table updates in consideration of varying platform workloads and current workload conditions. In a block 610 a determination is made to whether an update should be performed. There are various bases that can be used for this determination, such as using a predetermined period, performance of a number of jobs using a given core, or other conditions indicating a change in workload.

When the answer to decision block 610 is YES, the logic proceeds to a block 612 in with the core-to-accelerator cost distance metrics are calculated and updated for applicable core-accelerator pairs based on current workload(s). For example, a given core-to-accelerator distance cost metric might be obtained via an actual end-to-end measurement (e.g., using a message/packet for this purpose) or might adapt an existing metric based on information exposed by various interfaces and queues on the platform. Generally, the updates might apply to an individual core, or multiple cores.

In a block 614, the core-to-accelerator cost table(s) is/are updated with the updated distance cost metrics calculated in block 612. The logic than loops back to decision block 610 and the process is repeated.

In addition to using ACPI, other firmware/BIOS components may be used to implement similar functionality to that described and illustrated by the foregoing embodiments. For example, such firmware/BIOS includes but is not limited to UEFI (Unified Extensible Firmware Interface) firmware.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'K', 'N', 'P', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a compute platform including a plurality of processor cores and a plurality of accelerator devices, comprising:
   executing an application on a first core;
   offloading a first offloaded portion of a workload for the application to a first accelerator device;
   moving execution of the application from the first core to a second core;
   selecting a second accelerator device to be used based on core-to-accelerator cost information for the second core; and
   offloading the first offloaded portion of the workload to the second accelerator device,
   wherein the core-to-accelerator cost information for the second core is based, at least on part, on latencies projected for interconnect paths between core-accelerator pairs including the second core and accelerators among the plurality of accelerators.

2. The method of claim 1, further comprising:
   storing core-to-accelerator cost information in at least one data structure on the compute platform;
   in connection with moving execution of the application from the first core to the second core, sending a request message including an identity of the second core to an entity enabled to access the at least one data structure; and
   one of,
      returning a response message including cost-to-accelerator cost information for that second core; or
      returning a response message identifying an accelerator having a lowest core-to-accelerator metric for the second core.

3. The method of claim 2, further comprising:
   calculating core-to-accelerator costs for multiple core-accelerator device pairs based on current platform core workloads, and
   updating the core-to-accelerator costs in the at least one data structure for the multiple core-accelerator device pairs.

4. The method of claim 2, wherein the entity enabled to access the at least one data structure comprises platform BIOS.

5. The method of claim 2, wherein the compute platform includes support for Advanced Configuration and Power Interface (ACPI) functions, and wherein the request message is an ACPI system call.

6. The method of claim 1, wherein the compute platform is a multi-socket platform including multiple sockets, each having a plurality of processor cores, and wherein the first core is on a first socket and the second core is on a second socket.

7. The method of claim 6, wherein the multi-socket platform is a Non-Uniform Memory Architecture (NUMA) platform, wherein the first offloaded portion of a workload has associated data that are stored in memory on the first socket, and wherein the data associated with the first offloaded portion of the workload remain in the memory on the first socket when the first offloaded portion of the workload is offloaded to the second accelerator device.

8. The method of claim 1, further comprising:
   employing transmit and receive rings for the first and second accelerator devices; and
   synchronizing the transmit and receive rings for the first and second accelerator devices.

9. The method of claim 1, further comprising:
   while executing the application on the first core, offloading a second offloaded portion of the workload for the application to a third accelerator device;
   in connection with moving execution of the application from the first core to the second core, selecting a fourth accelerator device to be used based on core-to-accelerator cost information for the second core; and
   offloading the second offloaded portion of the workload to the fourth accelerator device.

10. The method of claim 9, wherein the first and third accelerator devices are implemented in a workflow and the second and fourth accelerator devices are implemented in the workflow further comprising synchronizing the states of the first and second accelerator devices and the states of the third and fourth accelerator devices.

11. A non-transitory machine-readable medium having instructions stored thereon, which are configured to be executed on at least one processor core in a compute platform having a plurality of processor cores and a plurality of accelerator devices, to enable the compute platform to:
   assigning execution of an application to a first core;
   assigning a first accelerator device to be used to process a first offloaded portion of a workload for the application that is offloaded to the first accelerator device;
   moving execution of the application from the first core to a second core;
   selecting a second accelerator device to be used based on core-to-accelerator cost information for the second core; and
   assigning the second accelerator device to be used for processing the first offloaded portion of the workload for the application,
   wherein the core-to-accelerator cost information for the second core is based, at least on part, on latencies projected for interconnect paths between core-accelerator pairs including the second core and accelerators among the plurality of accelerators.

12. The non-transitory machine-readable medium of claim 11, wherein execution of the instructions further enables the compute platform to:

in connection with moving execution of the application from the first core to the second core, send a request message including an identity of the second core to an entity enabled to access at least one data structure in which core-to-accelerator cost information is stored; and one of,
- receive a response message including cost-to-accelerator cost information for that second core; or
- receive a response message identifying an accelerator having a lowest core-to-accelerator metric for the second core.

13. The non-transitory machine-readable medium of claim 12, wherein the compute platform includes support for Advanced Configuration and Power Interface (ACPI) functions, and wherein the request message is an ACPI system call (syscall).

14. The non-transitory machine-readable medium of claim 11, wherein the compute platform includes at least one data structure in which core-to-accelerator cost information is stored, and wherein execution of the instructions further enables the compute platform to:
- calculate core-to-accelerator costs for multiple core-accelerator device pairs based on current platform core workloads, and
- update core-to-accelerator costs in the at least one data structure for the multiple core-accelerator device pairs.

15. The non-transitory machine-readable medium of claim 11, wherein the compute platform is a multi-socket platform including multiple sockets, each having a plurality of processor cores, and wherein the first core is on a first socket and the second core is on a second socket.

16. A compute platform, comprising:
- a plurality of processor cores, operatively coupled to at least one memory; and
- a plurality of accelerator devices,
- wherein the compute platform is configured to,
  - execute an application on a first core;
  - offload a first offloaded portion of a workload for the application to a first accelerator device;
  - move execution of the application from the first core to a second core;
  - select a second accelerator device to be used based on core-to-accelerator cost information for the second core; and
  - offload the first offloaded portion of the workload to the second accelerator device,
- wherein the core-to-accelerator cost information for the second core is based, at least on part, on latencies projected for interconnect paths between core-accelerator pairs including the second core and accelerators among the plurality of accelerators.

17. The compute platform of claim 16, wherein the compute platform is further configured to:
- store core-to-accelerator cost information in at least one data structure;
- in connection with moving execution of the application from the first core to the second core, send a request message including an identity of the second core to an entity enabled to access the at least one data structure; and
- one of,
  - return a response message including cost-to-accelerator cost information for that second core; or
  - return a response message identifying an accelerator having a lowest core-to-accelerator metric for the second core.

18. The compute platform of claim 17, wherein the compute platform includes support for Advanced Configuration and Power Interface (ACPI) functions, and wherein the request message is an ACPI system call.

19. The compute platform of claim 16, wherein the compute platform is a multi-socket platform including multiple sockets, each having a plurality of processor cores, and wherein the first core is on a first socket and the second core is on a second socket.

20. The compute platform of claim 16, wherein the compute platform is further configured to:
- while executing the application on the first core, offload a second offloaded portion of the workload for the application to a third accelerator device;
- in connection with moving execution of the application from the first core to the second core, selecting a fourth accelerator device to be used based on core-to-accelerator cost information for the second core; and
- offload the second offloaded portion of the workload to the fourth accelerator device.

* * * * *